Patented Feb. 19, 1946

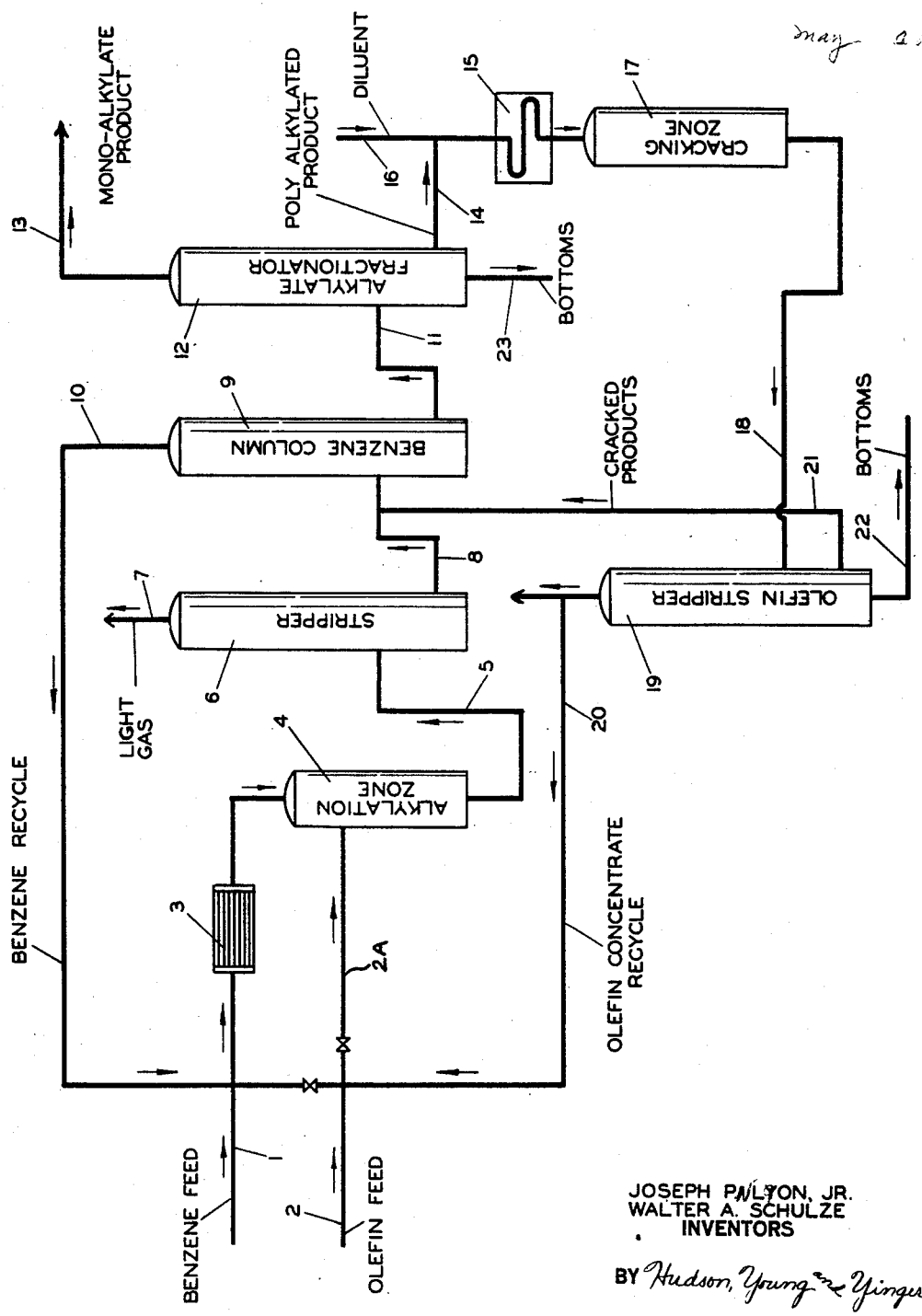

2,395,199

UNITED STATES PATENT OFFICE 2,395,199

ALKYLATION PROCESS

Walter A. Schulze and Joseph P. Lyon, Jr., Bartlesville, Okla., assignors to Phillips Petroleum Company, a corporation of Delaware Application October 5, 1942, Serial No. 460,847

3 Claims. (Cl. 260—672)

The present invention relates to the synthesis of alkyl benzenes by catalytic condensation of benzene with aliphatic alkylating agents. More specifically this invention relates to the alkylation of benzene with aliphatic olefins to produce mono-alkylated derivatives in improved yields and purity.

While capable of broad application within the terms of the disclosure to follow, this invention provides specifically for the more efficient production of ethylbenzene from alkylation reactions by means of a novel utilization of the polyethylated products concurrently formed.

The alkylation of aromatic hydrocarbons wherein alkyl side chains are attached to the aromatic nucleus may be effected in the presence of a variety of alkylation catalysts, and with alkylating agents in various forms such as alkyl halides, alcohols and olefins. One efficient procedure comprises the direct catalytic condensation of benzene with ethylene or its higher homologues to produce alkyl benzenes valuable as blending agents in special hydrocarbon fuels and/or as starting materials for the production of other valuable compounds such as styrene which is a valuable synthetic rubber starting material.

In the alkylation of benzene with olefins or compounds yielding olefins, a succession of reactions may take place whereby the alkylated products comprise a mixture of mono-, di- and tri-alkylated compounds, up to the limit of substitutable hydrogen atoms on the nucleus. Apparently the introduction of the original alkyl group activates the nucleus for further substitution, so that the mono-alkyl benzenes are subject to further alkylation to an extent dependent on the catalyst, the olefin alkylating agent, and the reaction conditions. Since the poly-alkyl benzenes are often relatively unsatisfactory products for the above-mentioned utilizations, their formation represents a loss of valuable raw materials and decreased yield from the alkylation process.

Various methods have been employed to suppress the formation of poly-alkyl benzenes and thereby increase the yield of the mono-alkylate. In some instances, a more selective catalyst and/or a catalyst active at milder conditions may permit a closer control of the alkylation reaction. Another or a supplementary method for controlling the extent of alkylation comprises the use of relatively large molar excesses of benzene in the reaction zone to reduce both the olefin and the mono-alkylate concentrations and thus decrease the continued interaction of these compounds. Otherwise, when the benzene-olefin molar ratio is near one, the continuation of the reaction to complete olefin utilization in the presence of decreasing benzene and increasing alkylate concentrations may produce larger amounts of poly-alkylated products.

While the above-mentioned methods are often satisfactory, it has been noted that their effectiveness varies greatly with the alkylating agent, and is limited in the synthesis of ethylbenzene. Even with the more selective catalysts, the temperature and/or pressure conditions favorable to ethylbenzene formation are often highly conducive to poly-alkylate formation. Under these conditions, when rather complete ethylene utilization is obtained, the percentage yield of polyethyl benzenes may be greatly increased.

In such a synthesis the production of polyethyl benzenes may be somewhat suppressed by the use of very high benzene-ethylene molar ratios and/or low per pass conversion and incomplete ethylene utilization. The chief disadvantages of these expedients, however, are lowered plant capacity in terms of ethylbenzene produced, and/or the increased costs of segregating, purifying and recycling unused ethylene.

In many instances the provision and handling of suitable ethylene feed stocks is so expensive that process economies are greatly affected by loss of efficiency in the alkylation reaction.

It is an object of this invention to provide an improved process for the synthesis of ethylbenzene.

It is a further object to provide an improved process for the production of ethylbenzene from benzene and an alkylating agent furnishing ethylene by means of a more efficient alkylation reaction.

A still further object of this invention is to provide an improved process for the synthesis of ethylbenzene wherein an efficient degree of olefin utilization is accomplished without incurring product losses in the form of poly-ethyl benzenes.

Yet another object is to provide an improved process of dealkylating poly-alkyl benzene to mono-alkyl benzene.

We have now discovered a process for the production of mono-alkyl benzenes, particularly ethylbenzene, wherein the poly-alkylated products resulting from the catalytic benzene-olefin condensation are separated and converted by catalytic cracking into the desired mono-alkyl derivative. By means of this process, the alkylation step may be conducted under optimum conditions for olefin utilization, while the products of secondary alkylation concurrently formed are converted to the primary mono-alkyl product together with materials returnable to the alkylation step.

In one specific embodiment, the process of this invention comprises the following steps: (1) reacting benzene with ethylene or an ethylene-containing mixture in the presence of an alkylation catalyst to produce alkylate consisting of ethylbenzene and usually smaller amounts of diethylbenzene and higher alkylate; (2) stripping reaction products from the alkylation step to remove unreacted light gases; (3) fractionally distilling liquid alkylation products to remove unreacted benzene; (4) further fractionating the alkylate to separate ethylbenzene from higher-boiling poly-ethyl benzenes; (5) treating the higher-boiling alkylate at elevated temperatures over a cracking catalyst to obtain partial conversion to ethylbenzene and a light gas fraction comprising ethylene; (6) passing the liquid products from the cracking step into the stream of liquid products from the alkylation step to recover the ethylbenzene.

The steps of this operation may be more clearly understood by reference to the drawing which represents one possible arrangement of process equipment for the practice of the invention. In the drawing, the benzene feed stream and the ethylene feed stream enter by lines 1 and 2 and pass through heat exchanger 3 wherein the temperature is adjusted to the level desired for reaction over the particular alkylation catalyst used in zone 4. The benzene-ethylene mixture passing through zone 4 undergoes alkylation producing ethylbenzene and usually a smaller amount of di- and triethylbenzenes.

The reaction products from the alkylation step pass through line 5 to stripper 6 wherein light gases such as unreacted components of the ethylene feed stream are separated and removed through line 7. The liquid products then pass through line 8 to fractionating column 9 which may be operated to remove excess benzene from the alkylate. This benzene is taken through line 10 and returned to the benzene feed line 1.

The alkylate passes from column 9 through line 11 to alkylate fractionator 12. In this unit the ethylbenzene product is separated from the higher-boiling alkylate and passed through line 13 to storage. The poly-alkylate fraction then passes through line 14 to the cracking step.

The higher alkylate in which diethylbenzene may be the principal component is first passed through heater 15 where it is vaporized and raised to cracking temperature. If desired a diluent may be added through line 16 to the alkylate before, in, or after the heating step. The stream from the heater then passes through cracking zone 17 containing a selective contact cracking catalyst. Products from the cracking step then pass through line 18 to a primary separator or stripping column 19 in which the light gas fraction comprising ethylene produced by the cracking operation is taken through line 20 for return to the ethylene feed stream.

Liquid products which may be taken as a side stream from column 19 through line 21 usually comprise ethylbenzene, unconverted higher alkylate, and a certain amount of benzene produced by complete side chain removal. By introducing this stream into the line 8 which carries liquid reaction products from alkylation, the same equipment may be used to recover the benzene for recycle, while the ethylbenzene is separated with the primary alkylation product. Unconverted heavy alkylate is then returned to the cracking step for further conversion to ethylbenzene.

Traces of heavy polymer and/or tarry material which may gradually accumulate from the high temperature cracking step may be withdrawn from the bottom of column 19 through line 22. A similar arrangement may be operated in column 12, whereby accumulations of very heavy material are withdrawn through line 23.

Various modifications of the illustrated flow diagram may be employed within the scope of the present invention, particularly in applications involving different catalysts and feed stream compositions. Such modifications however, affect mainly the associated operations without altering basic process steps.

In the synthesis of relatively pure products, it is advantageous to employ benzene and ethylene feed stocks of relatively high purity and/or substantially free of components capable of interfering in any of the subsequent separation steps. Benzene feed stocks may ordinarily be provided in substantially pure form and the efficiency of the conversion to ethylbenzene makes this practice economical. The benzene feed may contain cycloparaffin or paraffin impurities which are substantially inert in the alkylation step. These materials are continuously or intermittently withdrawn from the system through treatment or segregation of the benzene recycle stream. Compounds reactive over the alkylation catalyst obviously may complicate the subsequent process steps.

The ethylene feed stream may be obtained from any suitable source such as thermal or catalytic cracking of hydrocarbon oils or gases, the dehydration of ethyl alcohol, or other direct or indirect means of supply. This use of alcohol yields a highly concentrated ethylene feed although usually at somewhat higher cost. In employing ethylene from petroleum refining processes, the feed stream may be somewhat less concentrated due to the difficulty and expense involved in producing relatively pure ethylene from hydrocarbon gas mixtures.

The present process is particularly well adapted to the utilization of ethylene-containing fractions without extensive purification, although higher olefins, e. g., propylene, are usually removed to prevent concurrent reaction over the alkylation catalyst and the production of complex alkylate mixtures. When ethane-ethylene stocks are available for the process, the ethane is readily removed from the effluent of the alkylation zone after utilization of the ethylene by flashing and/or stripping in column 6. In such circumstances, it is highly desirable to obtain the substantially complete ethylene utilization made possible by the present process to avoid compression and recycling of a lean ethylene stream after the alkylation step.

The benzene and ethylene feed streams are ordinarily combined in proportions which give a predetermined benzene-ethylene molar ratio in the alkylation zone. The presence of excess benzene in the alkylation reaction favors more complete ethylene utilization and at the same time limits the extent of polyalkylation over most catalysts to the formation of diethylbenzene with usually traces of triethylbenzene. Still more highly substituted derivatives may be handled in the present process, but it is ordinarily preferred to limit the extent of substitution to a certain degree which, however, does not interfere with ethylene utilization or the efficiency of alkylation.

The benzene-ethylene molar ratios employed will usually range between the theoretically equivalent quantities and those providing a moderate control of the extent of poly-alkylation. Since it is not necessary in the present process to employ very large excesses of benzene in an effort to completely suppress poly-alkylation, efficient feed ratios are often in the range of about 1:1 to about 4:1, with the choice depending to some extent on the alkylation catalyst employed. It is preferred to use a ratio in excess of 1:1.

While the flow diagram shows pre-mixing of the benzene and ethylene feed streams ahead of the alkylation catalyst, other arrangements may be employed as indicated by line 2A in the drawing. For example, the ethylene feed may be passed into a benzene-catalyst mixture in the alkylation zone, or even injected multi-pointwise into the benzene stream passing in contact with the catalyst. The means of preparing the reactant feed mixture and the method of contacting will depend to a large extent on the type of catalyst employed.

Any of the conventional alkylation catalysts which are capable of promoting complete and selective alkylation with ethylene may be used in the present process. These may include aluminum halides and the like, the strong mineral acid condensing agents comprising sulfuric, phosphoric and hydrofluoric acid, organic or inorganic complexes by boron trifluoride, or various combinations of these catalysts with each other or with promoters. The physical form of the catalyst, whether a liquid or a liquid or solid supported on a carrier will often govern the method of contacting hydrocarbon reactants with the catalyst in the alkylation step.

A type of catalyst which may be advantageously utilized for the alkylation step is a solid gel-type catalyst comprising silica gel activated with oxides of alumina, zirconia, etc. in minor quantities. In the use of these solid contact catalysts, the hydrocarbon feed is often passed in liquid or mixed phase through the alkylation zone.

Since the activity of the various types of alkylation catalysts and the conditions under which they are used are obviously different, it is not possible to generalize on operating conditions in the alkylation zone. The selection of suitable conditions will be well within the skill of those versed in the art in the light of this disclosure. Specific illustrations of the utilization of certain catalysts are provided in the non-limiting exemplary operations described hereinafter, and the use of conventional catalysts will be familar to those skilled in the art of alkylation.

The sequence of fractionation operations may be modified if desired, according to the process requirements. Thus, the alkylation reaction product may be passed directly to equipment for the removal of benzene, with any light gases being merely weathered from the benzene recycle stream. Or if mixtures of benzene and ethylbenzene are satisfactory, it may in some cases be possible to eliminate the benzene separation step. The efficiency of fractionation is ordinarily governed by the desired purity of the products.

The charge to the cracking step may comprise the total alkylate higher boiling than ethylbenzene or a controlled portion thereof whose characteristics are governed by the location of the take-off line 14. With moderate regulation of the alkylation reaction, the entire bottoms fraction from column 12 may be utilized, although the feed characteristics are often chosen to give maximum catalyst life between regenerations.

The cracking reaction whereby the poly-ethyl benzenes are converted to ethylbenzene may be exemplified by the following equation.

$$C_6H_4(C_2H_5)_2 \longrightarrow C_6H_5-C_2H_5 + C_2H_4$$
Diethylbenzene    Ethylbenzene    Ethylene This splitting off of the alkyl side-chain requires a highly selective catalyst and controlled reaction conditions to suppress secondary reactions such as the cracking and/or polymerization of the ethylene and the further cracking of ethylbenzene to benzene.

While a number of types of solid adsorbent cracking catalysts may be utilized in the present process, those most active and selective at moderate temperatures are certain silica-alumina compositions, characterized by the method of preparation and/or activation. These silica-alumina catalysts are predominantly silica in highly adsorbent form, activated with minor amounts of alumina. Other metal oxides such as zirconia and titania may also be present in small quantities along with the silica and alumina. These catalysts are often synthetic preparations of the gel-type formed by precipitation from suitable aqueous salt solutions by means known to the art, and carefully dried and activated to retain their structure and adsorbent characteristics.

Other types of silica-alumina catalysts may be prepared from naturally-occurring minerals such as zeolites and clays by acid treatment to remove ferrous impurities and the like and to adjust the silica-alumina ratio, although such preparations are usually less active than the preferred synthetic gels and require higher cracking temperatures. Certain natural clays of low iron contents are also usable without chemical treatment, although their activity is low compared to the preferred catalysts.

Bauxite, preferably of low iron content is active in a somewhat higher temperature range than the synthetic silica-alumina catalysts. Brucite may be utilized at about the same temperatures as bauxite. Synthetic alumina and magnesia preparations are still less active, and may increase secondary cracking reactions.

The poly-ethyl benzene charge to the cracking zone is vaporized and contacted in vapor form with the solid contact catalyst at conditions of temperature, pressure and flow rate (contact time) chosen to produce maximum yields of ethylbenzene at a suitable per pass conversion. While the optimum cracking conditions are different for the different types of catalysts satisfactory conversion is usually obtained in the temperature range of about 950 to about 1150° F. In general, the minimum temperature which will give suitable conversion is employed in order to reduce secondary cracking and prolong catalyst life.

Pressures in the cracking step are usually maintained at low values to favor the cracking reaction and to suppress undesirable side reactions. In most cases, low near-atmospheric pressures of about zero to about 100 pounds gage are satisfactory and sustain the flow of vapors through cracking and auxiliary equipment. Sub-atmospheric pressures may be used in special circumstances.

Flow rates are chosen to conform to temperature conditions in order to control the per pass conversion and the extent of secondary cracking.

Flow rates of about 1 to about 10 liquid volumes of charge per volume of catalyst per hour are usually satisfactory.

In order to suppress coke and carbon formation on the cracking catalyst and to supply a portion of the reaction heat at the relatively high temperature levels employed, it is often desirable to incorporate a substantially inert diluent and heat carrier with the hydrocarbon charge to the cracking step. Such diluents may be added at one or more points ahead of or directly into the catalyst space. A preferred diluent is steam which is suitably inert, and which is easily separable from the cracked products stream by condensation. Other possible diluents include nitrogen, carbon dioxide and methane, although when these gases are employed, the ethylene produced by the cracking step may be less desirable for recycling because of the dilution.

The reaction products from the cracking zone, after partial cooling and condensation of the liquid components, yield a light gas fraction high in ethylene, together with ethylbenzene, some benzene, and uncracked poly-ethyl benzenes. The ethylene concentrate is often returned to the alkylation step without further purification and unreactive components are removed from the alkylation products. The liquid hydrocarbons may be returned to the stream of liquid alkylation products ahead of either the benzene or ethylbenzene separation step, depending on the operation of the fractionators and on the purity of the ethylbenzene being produced. The concentration of heavy ethylene polymer and/or alkylate higher boiling than the original charge to the cracking step is regulated by withdrawal of accumulations of such material from the cracked products either intermittently or continuously.

When the cracking catalyst becomes deactivated during use through the deposition of carbonaceous material, it may be restored to its original activity by burning off the deposits. Mixtures of air and inert gas of controlled oxygen content are ordinarily employed in reactivation for the purpose of controlling the temperature below values injurious to the physical structure and activity of the actalyst. In the reactivation of silica-alumina catalyst, temperatures above about 1100° F. are usually undesirable, although with most of the other types of catalyst, somewhat higher temperatures up to about 1300° F. are permissible in reactivation.

As examples of the practice of the invention and of the increased yields and operational benefits derived from said practice, the following applications to the synthesis of ethylbenzene are cited.

Example I

An alkylation operation producing ethylbenzene was conducted by alkylating benzene with an ethylene concentrate containing about 50 mol per cent of ethylene, with the balance mainly ethane. The alkylation catalyst was synthetic silica gel activated with about 2 weight per cent of alumina. The benzene-ethylene feed was premixed in a molar ratio of 1.5:1 and this feed was passed over the catalyst at 500–525° F. and 1000 pounds gage pressure. The feed rate was about 2 liquid volumes per volume of catalyst per hour, and under the alkylating conditions the hydrocarbons were at least partially in liquid phase.

The products of alkylation were stripped of light gases comprising ethane and other inert or paraffinic components of the ethylene concentrate, and the vented gas contained less than 1 per cent ethylene.

The liquid alkylation products were successively fractionated to remove unreacted benzene, and to separate ethylbenzene from diethylbenzene and higher substituted homologs. The alkylate consisted of 68 weight per cent ethylbenzene and 32 weight per cent poly-ethyl benzenes, with the latter over 90 per cent diethylbenzene. The ethylbenzene was recovered substantially pure, and the poly-ethyl benzene mixture was passed to the catalytic cracking step.

The poly-ethyl benzenes charge admixed with steam in a steam-hydrocarbon mol ratio of 4:1 was passed at 990° F. and 5 pounds gage pressure over silica-alumina catalyst similar to that employed in alkylation. The hydrocarbon flow rate was 1.5 liquid volumes per volume of catalyst per hour. The effluent products were cooled to condense the liquid components and water, with the latter separated prior to fractionation. Light gases were removed from the condensed hydrocarbons, and the gas mixture had the following approximate composition:

| | Weight percent |
|---|---|
| C₄ and heavier | 3.0 |
| Ethane | 4.7 |
| Ethylene | 92.3 |

This gas was recycled directly to the alkylation step for further use.

The liquid hydrocarbon stream which was added to the stream of alkylation products prior to the separation of benzene had the following approximate composition:

| | Weight percent |
|---|---|
| Benzene | 3.5 |
| Ethylbenzene | 20.0 |
| Unconverted charge | 73.5 |
| Heavy material (higher boiling than charge) | 3.0 |

The per pass conversion in the cracking step was about 31 weight per cent of the charge and the ultimate yields of the various products, based on the weight of charge converted were approximately as follows:

| | Weight percent |
|---|---|
| Ethylene | 20 |
| Benzene | 10 |
| Ethylbenzene | 66 |
| Heavy bottoms | 4 |

On the above basis, the efficiency in cracking to useful products was over 90 per cent.

The combined process steps thus gave a direct yield of ethylbenzene of about 90 per cent of materials charged to the alkylation step, without considering the ethylene and benzene recovered from the cracking step. This improved yield compared with a value of only 68 per cent ethylbenzene from this particular alkylation operation alone.

Example 2

A alkylation feed containing benzene and ethylene in a molar ratio of 3:1 was contacted with a catalyst consisting of a liquid complex of boron fluoride and orthophosphoric acid. Alkylation conditions were 120° F., 300 pounds gage pressure and a contact time of 15 minutes. Ethylene utilization was substantially complete. The unreacted benzene was separated from the liquid alkylation products and recycled and the alkylate was then fractionated to separate ethylbenzene from higher-boiling material. The alkylate composition was approximately 84 weight per cent ethylbenzene and 16 per cent diethylbenzene, with traces of triethylbenzene.

The diethylbenzene fraction was accumulated and charged intermittently to a cracking step employing synthetic silica-alumina gel cracking catalyst at a temperature of 1025° F. and a flow rate of 3 liquid volumes per volume of catalyst per hour. The pressure was only sufficient to maintain vapor flow through the equipment. The per pass conversion under these conditions was about 40 weight per cent of the charge, and the liquid products which were added to the alkylate fractionator had the following approximate composition:

| | Weight percent |
|---|---|
| Benzene | 6 |
| Ethylbenzene | 24 |
| Diethylbenzene | 65 |
| Heavy bottoms | 5 |

The additional ethylbenzene recovered increased the overall process yield to nearly 95 per cent of the theoretical production.

We claim:

1. The process of converting poly-alkyl benzene to mono-alkyl benzene in which the alkyl group is the same as in the poly-alkyl benzene which comprises contacting said poly-alkyl benzene in the absence of benzene with a solid contact catalyst consisting of silica gel activated with a minor proportion of alumina at a temperature ranging from about 950 to 1150° F., at a pressure ranging from substantially atmospheric to about 100 pounds per square inch gage and at a flow rate of from about 1 to about 10 liquid volumes of feed per volume of catalyst per hour and thereby effecting simple splitting off of the alkyl side chains in excess of one with the formation of mono-alkyl benzene in which the alkyl group is the same as it was in the poly-alkyl benzene and the olefin corresponding to the split off alkyl group as the principal reaction.

2. The process of claim 1 wherein steam is used as an inert diluent and wherein the charge to the catalyst consists essentially of said poly-alkyl benzene and steam.

3. The process of claim 1 wherein said poly-alkyl benzene is diethylbenzene and is converted to mono-ethyl benzene and ethylene.

WALTER A. SCHULZE.
JOSEPH P. LYON, Jr.